United States Patent
Farmahini Farahani et al.

(10) Patent No.: US 11,119,923 B2
(45) Date of Patent: Sep. 14, 2021

(54) LOCALITY-AWARE AND SHARING-AWARE CACHE COHERENCE FOR COLLECTIONS OF PROCESSORS

(71) Applicant: Advanced Micro Devices, Inc., Sunnyvale, CA (US)

(72) Inventors: Amin Farmahini Farahani, Santa Clara, CA (US); Nuwan Jayasena, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 203 days.

(21) Appl. No.: 15/440,979

(22) Filed: Feb. 23, 2017

(65) Prior Publication Data
US 2018/0239702 A1 Aug. 23, 2018

(51) Int. Cl.
| | | |
|---|---|---|
| G06F 3/06 | (2006.01) |
| G06F 12/00 | (2006.01) |
| G06F 13/00 | (2006.01) |
| G06F 12/0813 | (2016.01) |
| G06F 12/0837 | (2016.01) |
| G06F 12/0811 | (2016.01) |

(52) U.S. Cl.
CPC ...... *G06F 12/0813* (2013.01); *G06F 12/0837* (2013.01); *G06F 12/0811* (2013.01); *G06F 2212/1024* (2013.01); *G06F 2212/1041* (2013.01); *G06F 2212/1048* (2013.01)

(58) Field of Classification Search
CPC ............. G06F 12/0804; G06F 2212/60; G06F 2212/608
USPC ......................................................... 711/135
See application file for complete search history.

(56) References Cited

U.S. PATENT DOCUMENTS

| | | | | |
|---|---|---|---|---|
| 5,212,778 A | * | 5/1993 | Dally .................... | G06F 15/167 711/200 |
| 5,835,950 A | * | 11/1998 | Cho .................... | G06F 12/0815 711/144 |
| 6,473,849 B1 | * | 10/2002 | Keller ................. | G06F 13/1657 709/210 |
| 6,968,447 B1 | * | 11/2005 | Apisdorf ................ | H04L 49/35 712/22 |
| 6,978,459 B1 | * | 12/2005 | Dennis ..................... | G06F 9/52 718/100 |

(Continued)

OTHER PUBLICATIONS

Bershad, B., et al., "The Midway Distributed Shared Memory System," IEEE Compcon Spring 1993, pp. 528-537.

(Continued)

*Primary Examiner* — Mohamed M Gebril
(74) *Attorney, Agent, or Firm* — Zagorin Cave LLP

(57) ABSTRACT

A cache coherence technique for operating a multi-processor system including shared memory includes allocating a cache line of a cache memory of a processor to a memory address in the shared memory in response to execution of an instruction of a program executing on the processor. The technique includes encoding a shared information state of the cache line to indicate whether the memory address is a shared memory address shared by the processor and a second processor, or a private memory address private to the processor, in response to whether the instruction is included in a critical section of the program, the critical section being a portion of the program that confines access to shared, writeable data.

20 Claims, 4 Drawing Sheets

(56) References Cited

U.S. PATENT DOCUMENTS

| | | | | |
|---|---|---|---|---|
| 7,171,521 | B2* | 1/2007 | Rowlands | G06F 12/084 711/141 |
| 10,042,762 | B2* | 8/2018 | Jayasena | G06F 12/0815 |
| 2004/0073755 | A1* | 4/2004 | Webb, Jr. | G06F 12/0826 711/144 |
| 2004/0199727 | A1* | 10/2004 | Narad | G06F 12/0862 711/138 |
| 2005/0066064 | A1* | 3/2005 | Micheal | G06F 9/526 710/1 |
| 2006/0161740 | A1* | 7/2006 | Kottapalli | G06F 9/3842 711/152 |
| 2010/0191914 | A1* | 7/2010 | Cantin | G06F 12/0811 711/122 |
| 2012/0036334 | A1* | 2/2012 | Horman | G06F 9/52 711/165 |
| 2012/0227045 | A1* | 9/2012 | Knauth | G06F 9/3004 718/100 |
| 2013/0254488 | A1* | 9/2013 | Kaxiras | G06F 12/0815 711/130 |
| 2014/0033217 | A1* | 1/2014 | Vajda | G06F 9/30189 718/102 |
| 2014/0258637 | A1* | 9/2014 | Hong | G06F 12/0808 711/135 |
| 2014/0281243 | A1* | 9/2014 | Shalf | G06F 12/0842 711/122 |
| 2015/0032998 | A1* | 1/2015 | Rajwar | G06F 9/3004 712/208 |
| 2015/0178199 | A1* | 6/2015 | Wang | G06F 12/082 711/122 |
| 2015/0278094 | A1* | 10/2015 | Ma | G06F 12/0811 711/122 |
| 2015/0286586 | A1* | 10/2015 | Yadav | G06F 12/1466 711/152 |
| 2015/0347302 | A1* | 12/2015 | Hagersten | G06F 12/0862 711/122 |
| 2016/0034397 | A1* | 2/2016 | Lam | G06F 12/0817 711/119 |
| 2016/0154735 | A1* | 6/2016 | Hwang | G06F 1/32 711/130 |
| 2016/0246641 | A1* | 8/2016 | Kogan | G06F 3/0629 |
| 2017/0017412 | A1* | 1/2017 | Luan | G06F 13/1663 |
| 2017/0068545 | A1* | 3/2017 | Nowak | G06F 9/30185 |
| 2017/0090977 | A1* | 3/2017 | Bradbury | G06F 12/0808 |
| 2017/0185518 | A1* | 6/2017 | Guim Bernet | G06F 12/084 |
| 2017/0220474 | A1* | 8/2017 | Dice | G06F 9/52 |
| 2017/0285976 | A1* | 10/2017 | Durham | G06F 12/1408 |
| 2017/0286310 | A1* | 10/2017 | Sukhomlinov | G06F 12/0811 |
| 2017/0286329 | A1* | 10/2017 | Fernando | G06F 13/1663 |
| 2018/0089083 | A1* | 3/2018 | Deshpande | G06F 12/0831 |
| 2018/0239702 | A1* | 8/2018 | Farmahini Farahani | G06F 12/0837 |
| 2019/0057173 | A1* | 2/2019 | Ventroux | G06F 30/33 |

OTHER PUBLICATIONS

Dubois, M., et al., "Delayed Consistency and Its Effects on the Miss Rate of Parallel Programs," CEng Technical Report 91-14, Department of Electrical Engineering—Systems, University of Southern California, Los Angeles, CA, Apr. 1991, 22 pages.

Hiechtman, B., et al., "QuickRelease: A Throughput-oriented Approach to Release Consistency on GPUs," IEEE 20th International Symposium on High Performance Computer Architecture (HPCA) 2014, 12 pages.

Hower, D., "Acoherent Shared Memory," Dissertation, University of Wisconsin—Madison, 2012, pp. 1-12.

Iftode, L., et al., "Scope Consistency : A Bridge Between Release Consistency and Entry Consistency," Proceedings of the Eighth Annual ACM Symposium on Parallel Algorithms and Architectures, 1996, 13 pages.

Kontothanassis, L., et al., "Lazy Release Consistency for Hardware-Coherent Multiprocessors," Department of Computer Science, University of Rochester, Dec. 1994, pp. 1-16.

Lebeck, A., and Wood, D., "Dynamic Self-Invalidation: Reducing Coherence Overhead in Shared-Memory Multiprocessors," Proceedings of the 22nd Annual International Symposium on Computer Architecture, 1995, 12 pages.

Nair, R., et al. "Active Memory Cube: A processing-in-memory architecture for exascale systems," IBM J. Research and Development, vol. 59, No. 2/3, Paper 17, Mar./May 2015, pp. 17:1-17:14.

Ros, A., and Kaxiras, S., "Complexity-Effective Multicore Coherence," PACT' 12, Sep. 19-23, 2012, pp. 241-251.

Singh, I., et el., "Cache Coherence for GPU Architectures," IEEE Micro, vol. 34, Issue 3, 2014, 13 pages.

U.S. Appl. No. 15/169,118, filed May 31, 2016, entitled "Cache Coherence for Processing in Memory," naming Michael W. Boyer and Nuwan Jayasena as inventors.

U.S. Appl. No. 15/264,804, filed Sep. 14, 2016, entitled Light-Weight Cache Coherence for Data Processors with Limited Data Sharing, naming Nuwan Jayasena and Michael Boyer as inventors.

* cited by examiner

LOCALITY-AWARE AND SHARING-AWARE CACHE COHERENCE FOR COLLECTIONS OF PROCESSORS

STATEMENT REGARDING FEDERALLY SPONSORED RESEARCH OR DEVELOPMENT

This invention was made with Government support under Prime Contract Number DE-AC52-07NA27344, Subcontract No. B608045 awarded by DOE. The Government has certain rights in the invention.

BACKGROUND

Description of the Related Art

In general, modern computing systems may incorporate multiple processors operating within a shared address space distributed across the system. Such systems may include multiple loosely-coupled (i.e., not on the same die/chip) processors, each being directly attached to some amount of local memory. In those systems, each processor is capable of accesses to other, remote memory in the shared address space, but local memory accesses have higher bandwidth and lower latency resulting in improved efficiency as compared to remote memory accesses. Thus, improved techniques for accessing remote memory in a shared address space are desired.

SUMMARY OF EMBODIMENTS OF THE INVENTION

In at least one embodiment, a method of operating a multi-processor system including shared memory includes allocating a cache line of a cache memory of a processor to a memory address in the shared memory in response to execution of an instruction of a program executing on the processor. The method includes encoding a shared information state of the cache line to indicate whether the memory address is a shared memory address shared by the processor and a second processor, or a private memory address private to the processor, in response to whether the instruction is included in a critical section of the program, the critical section being a portion of the program that confines access to shared, writeable data. The shared information state may indicate that the memory address is a shared address storing shared, writeable data in the shared memory. The shared information state may indicate that the memory address is a private address in the shared memory. The method may include executing, by the processor, a first operation indicating a beginning of the critical section prior to encoding the shared information state. The method may include executing, by the processor, a second operation indicating an end of the critical section after encoding the shared information state. Executing the second operation may include writing contents of the cache line to the shared memory in response to the shared information state indicating the memory address is a shared memory address and an information state of the cache line indicating that the cache line is dirty. The method may include encoding a remote storage state of the cache line to indicate whether the memory address is remote to the processor or local to the processor.

The method may include flushing the cache line and loading data from the memory address into the cache line in response to an access to the memory address in the critical section, the remote storage state indicating the memory address is remote, and a first access state indicating the access is a first access to the memory address in a critical section of the program. The method may include encoding the first access state to indicate a next access to the cache line in the critical section is not the first access. The method may include, in response to executing an operation indicating a beginning of the critical section of the program, initializing the first access state to indicate the first access has not yet occurred. The processor may include a first memory of the shared memory and a second processor includes a second memory of the shared memory. The first memory may be local to the processor and remote to the second processor. The second memory may be remote to the processor and local to the second processor.

In at least one embodiment, a processing system includes a processor, a cache controller of the processor, a cache memory of the processor coupled to the cache controller. The cache memory includes a cache line including a tag portion, a data portion, and a metadata portion. The cache controller is configured to allocate the cache line to data associated with a memory address in a shared memory, in response to execution of an instruction of a program executing on the processor. The cache controller is configured to encode in the metadata portion a shared information state of the cache line to indicate whether the memory address is a shared memory address shared by the processor and a second processor, or a private memory address private to the processor, in response to whether the instruction is included in a critical section of the program, the critical section being a portion of the program that confines access to shared, writeable data. The shared information state may indicate the memory address is a shared address storing the shared, writeable data in the shared memory. The shared information state may indicate the memory address is a private address in the shared memory, the private address being private to the processor.

The processing system may include a local memory of the processor, and a shared memory comprising a plurality of memory portions distributed across the processor and other processors. The plurality of memory portions may include the local memory and other memory portions. The other memory portions may be remote to the processor, and the local memory being remote to the other processors. The cache line may correspond to a location in the shared memory and the location may be accessed in the critical section. The critical section may include a first operating indicating a beginning of the critical section and a second operating indicating an end of the critical section. The cache controller may be configured to write the contents of the cache line to the shared memory in response to the shared information state indicating that the memory address is a shared memory address, a dirty information state encoded in the metadata portion indicating that the cache line is dirty, and execution of the second operation. The metadata portion may further encode a remote storage state indicating whether the memory address is in a local memory portion of the processor or is in a remote memory portion of another processor. The cache controller may be configured to write the cache line back to memory in response to the release instruction being executed and the shared information state indicating the memory address is a shared memory address. The metadata portion may further encode a first access state of the memory address. In response to the shared information state indicating the memory address is a shared memory address, the cache controller may be configured to flush the cache line, load new data from the memory address into the cache, and to update the first access state in response to the first access state indicating the instruction is a first access of the cache line and a remote state indicating the memory address is remote to the processor. The cache controller may be configured to initialize the first access state in response to the processor executing an operation indicating a beginning of a critical section of the program.

In at least one embodiment, a method of operating a multi-processor system including shared memory includes executing, by a processor, a first operation indicating a beginning of a critical section of a program executing on the processor, the critical section being a portion of the program that confines access to shared writeable, data. The method includes executing, by the processor, a second operation indicating an end of the critical section. Executing the second operation includes writing contents of a cache line to the shared memory in response to a shared information state of the cache line indicating that the cache line is allocated to a memory address shared by the processor and a second processor and an information state of the cache line indicating that the cache line is dirty. The method may include flushing the cache line and loading data from the memory address into the cache line in response to an access to the cache line in the critical section. The flushing is responsive to a remote storage state indicating whether the memory address is remote or local and a first access state indicating the access is a first access to the memory address in the critical section. The method may include encoding the first access state to indicate a next access to the memory address in the critical section is not the first access. The method may include, in response to executing the first operation, initializing a first access state to indicate a first access of the memory address in the critical section has not yet occurred.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
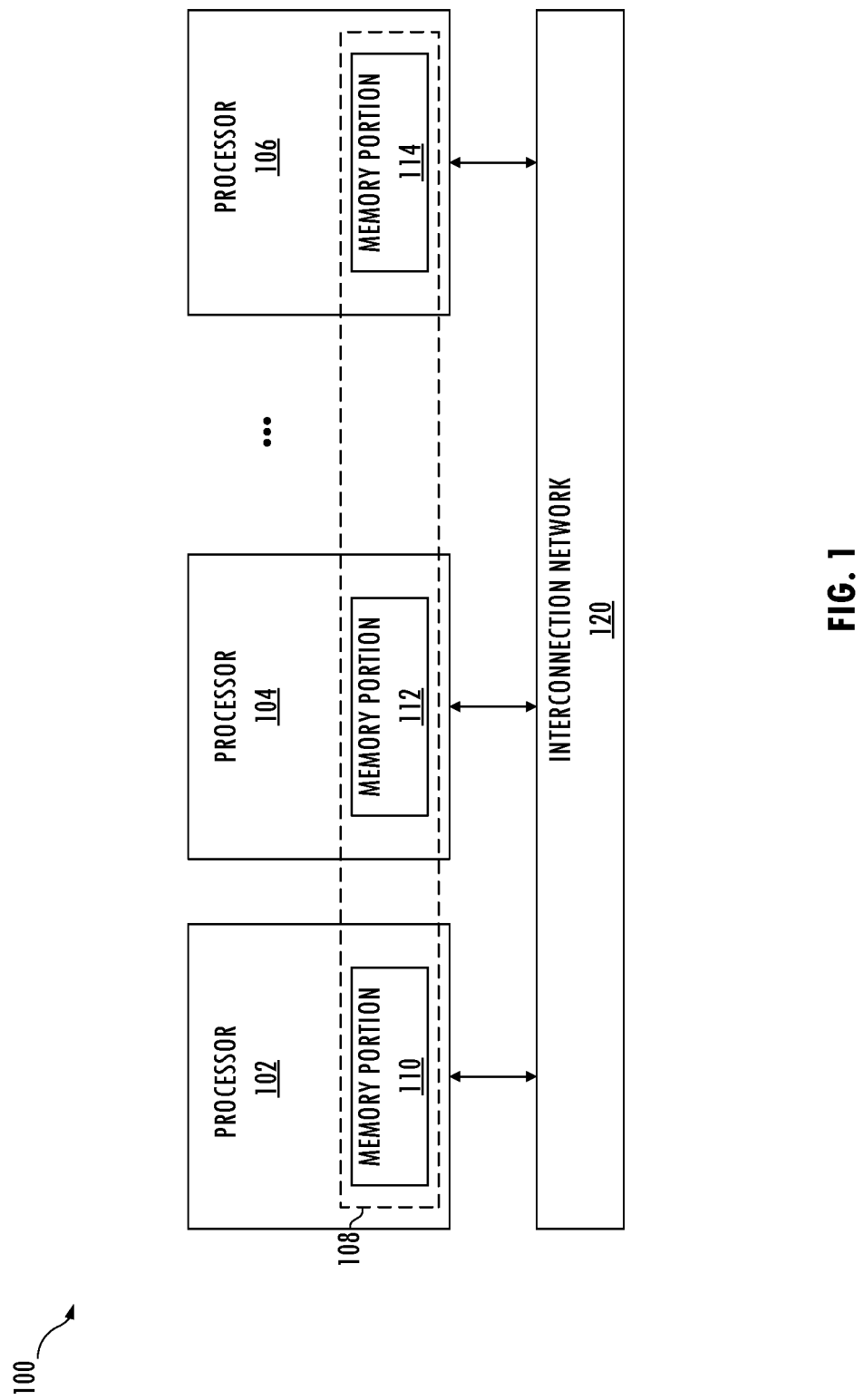
FIG. 1 illustrates an exemplary multiprocessor system including a shared memory system.

A cache coherence technique for multi-processor, distributed memory systems aware of memory address locations and sharing of contents of memory addresses reduces storage and coherence overhead and improves performance in distributed, shared memory multi-processor systems. The cache coherence technique uses a cache coherence model that distinguishes between remote data and local data and distinguishes between shared data and private data. In at least one embodiment, the cache coherence technique implements hardware, memory semantics, and synchronization operations that improve performance of distributed, shared-memory systems (e.g., Non-uniform Memory Access (NUMA) memory systems) with low data sharing among processors and in which individual processors perform most memory accesses to addresses in corresponding local memories. The cache coherence technique is a scalable coherence mechanism for distributed shared-memory systems that implements a selective approach for flushing or invalidating data at synchronization points and that leverages locality and sharing attributes of data to reduce occurrences of invalidations and to obviate the need to monitor sharers in a directory structure.

In some circumstances, conventional cache coherence mechanisms incur high overhead, e.g., for bandwidth-intensive accelerators such as graphics processing units (GPUs) and require high-bandwidth links, e.g., among memory modules of processing in memory (PIM), which can be prohibitively expensive. Conventional cache coherence techniques rely on either a broadcast mechanism, which makes any memory access by any processor visible to all other coherent processors, or a directory structure, which stores information about cache lines cached by the processors. The broadcast mechanism does not easily scale to large numbers of coherent processors or to bandwidth-intensive devices (e.g., GPUs and PIMs). Although the directory technique is more scalable, it incurs high storage overhead and design complexity to track cache line information and maintain cache coherence. Further, directory-based coherence protocols require knowledge at design time of the number of coherent processors in the system or incur additional overhead (e.g., over-provisioning of directory state, which wastes storage space, or coarse-grain sharer encodings, which result in multi-casting coherence messages to subsets of nodes in the system when any node in the subset has a cached copy).

Cache coherence techniques that simply make shared data uncacheable may substantially degrade performance due to inefficient use of memory bandwidth and long load latencies due to being unable to exploit temporal and spatial locality. Cache coherence provided using cache flushes of cached writes at synchronization points to provide visibility of data to other processors and to purge local copies to read updates from other processors exploit relaxed memory models typically used in accelerator-based systems. However, cache flushing is expensive for fine-grain data sharing or synchronization since it evicts the entire contents of the cache(s). A timestamp-based scheme for cache coherence within a graphics processing unit, which may apply to multiple accelerators, PIM devices, or processors, requires estimating the time period for which a cache line will stay live in the remote caches and also requires maintaining a globally synchronized timer among all processors. The latter is particularly challenging for distributed multi-processor systems that are implemented on multiple chips and for systems that need to scale to multiples of such processors. That technique requires substantial changes to existing cache organization and coherence mechanisms.

Referring to FIG. 1, processing system 100 includes shared memory 108, having a unified virtual address space. Processing system 100 implements a cache coherence technique that substantially reduces overhead associated with cache coherence for systems including processors that infrequently share data and mostly access local data in a processing system with a relaxed memory model (e.g., certain systems of near-memory processors, multiple discrete GPUs, and shared-memory multi-processor systems with distributed memory). However, the cache coherence technique is applicable to other systems of cache-coherent processors. The cache coherence technique includes hardware features and applies unique semantics for load, store, acquire and release operations. Different operations apply to different regions of memory at each processor depending on whether the instruction operands indicate physical memory addresses corresponding to memory local to the processor or to memory remote to the processor (e.g., in another processor).

Processing system 100 includes a distributed, shared memory system. For example, all memory locations of memory system 108 are accessible by each of processors 102, 104, and 106. Memory system 108 includes multiple memory portions, which are distributed across processors 102, 104, and 106. Memory portion 110 is local to processor 102 (e.g., tightly integrated with processor 102) and remote to processors 104 and 106 (e.g., within processing system 100 and accessible to processors 104 and 106, but not local to processors 104 and 106). Similarly, memory portion 112 is local to processor 104 and remote to processors 102 and 106 and memory portion 114 is local to processor 106 and remote to processors 102 and 104. In general, processors have high bandwidth and low-latency access to local memory. Processor accesses to remote memory are slower due to communication over interconnection network 120. In some embodiments, each memory portion of memory system 108 includes a 3D-stacked memory, conventional DIMM-based memory, other type of memory, or a combination thereof.

Processing system 100 implements memory consistency models that require memory operations to follow specific rules. Processing system 100 guarantees that if the programmer follows those rules, the memory will be consistent and the result of memory operations will be predictable. Compilers for processing system 100 reorder memory instructions when appropriate pursuant to memory consistency rules. As referred to herein, a critical section is a portion of a program that includes one or more instructions that access a shared resource (e.g., data structure or device) that must not be concurrently accessed by more than one thread of execution. Processing system 100 implements a memory consistency model in which all accesses to shared, writeable data are within clearly delineated critical sections. The memory consistency model is applicable to release consistency (RC) models if accesses to shared, writeable data are confined within a pair of acquire-release operations. The consistency model of processing system 100 is similar to scope consistency (SC) in which all critical sections have a single scope and the memory consistency model does not differentiate between scopes.

Each processor of processing system 100 can access remote memory, but each processor has higher bandwidth, lower latency access, and/or more efficient access to directly attached, local memories. Applications targeted for these memory systems will mostly operate out of local memory, with only infrequent access to remote memories of the memory system 108. Processing system 100 implements an inter-processor coherence mechanism developed for these distributed shared-memory systems where a portion of memory is assigned to each processing node. The processors (processing nodes) can internally implement a different coherence mechanism for their internal cache hierarchy (intra-processor coherence for caches associated with processor cores/accelerator cores/GPU cores/execution cores/ etc. within a processor) if their internal cache coherence mechanism is consistent with the inter-processor protocol.

Figure 2:
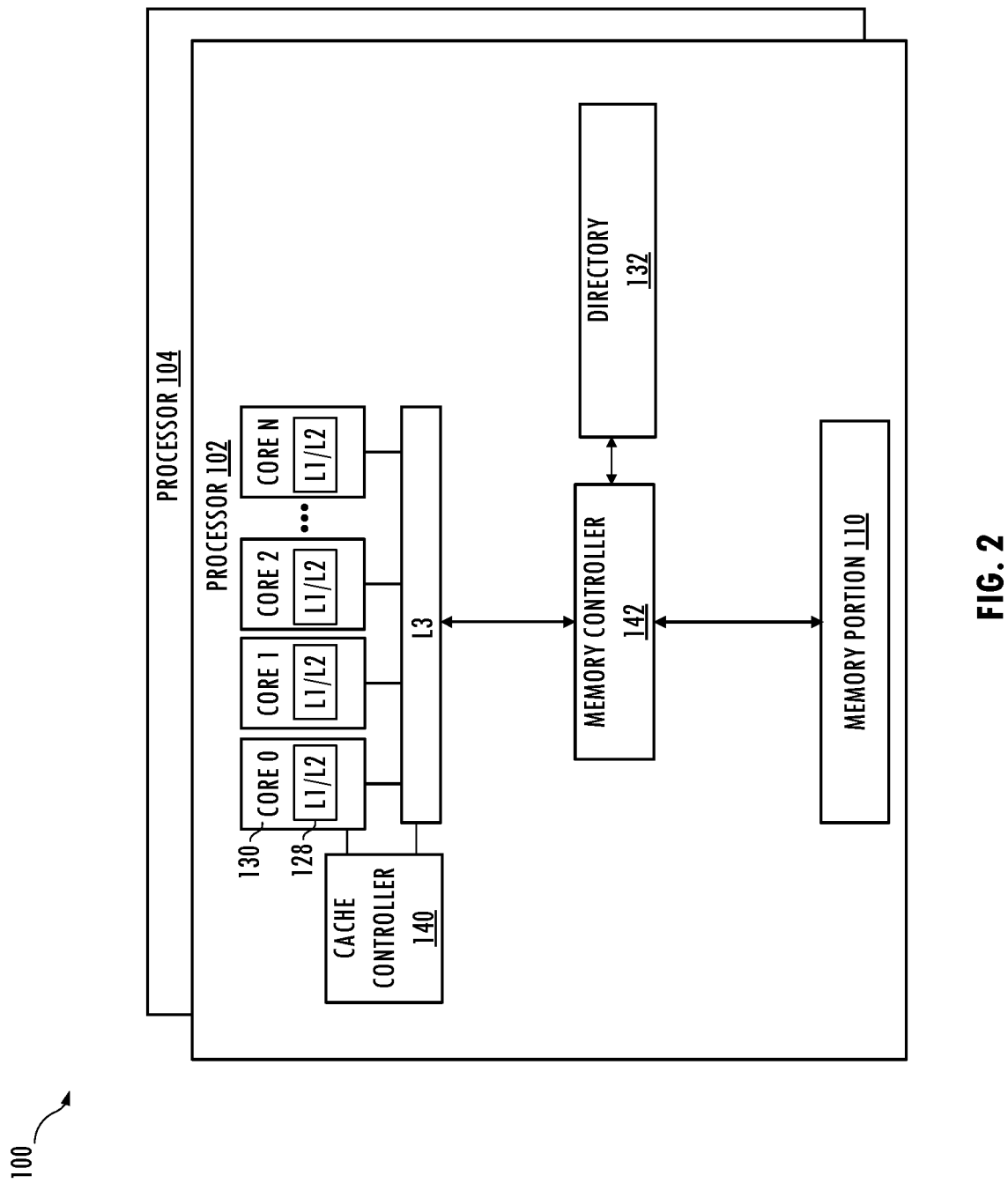
FIG. 2 illustrates an exemplary processor of the multi-processor system of FIG. 1.

Referring to FIG. 2, each processor (or processing node), e.g., processor 102, includes multiple homogenous/heterogeneous cores that execute instructions of one or more programs. Each processor includes one or more chips including the processor cores and memory. The processors implement their own intra-processor cache coherence protocol. Processors 102, 104, and 106 include general purpose processor cores, central processing units, GPUs, processor accelerators (e.g., units consistent with Heterogeneous System Architecture (HSA) or Coherent Accelerator Processor Interface (CAPI)), PIMs that incorporate accelerators in each memory module, or other suitable units. Processor 102 includes caches that need to be kept coherent. For example, processor 102 includes a three-level cache having a level-three cache as the last-level cache and each core of processor 102 includes corresponding level-one and level-two caches. In at least one embodiment, memory controller 142 and directory 132 include control logic and storage for a cache directory used to implement a directory-based cache coherency policy among the caches within processor 102.

Figure 4:
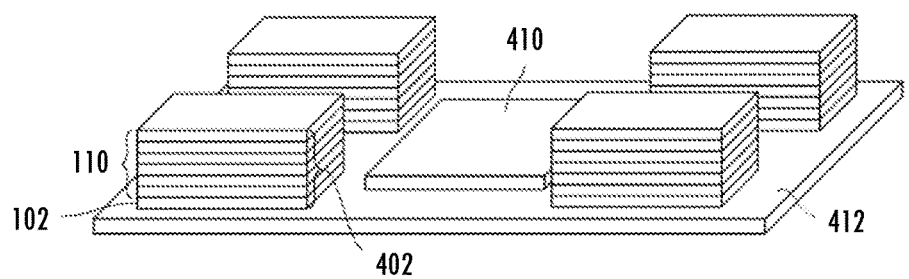
FIG. 4 illustrates an exemplary multiprocessor system with processor in memory modules including the processors and associated attached memories forming a shared memory system.

In at least one embodiment of processing system 100, each processor is a PIM and the coherence mechanism is used as an inter-PIM coherence protocol in which each PIM is considered a separate processor. For example, referring to FIG. 4, host 410 and four PIM devices are mounted on interposer 412. PIM device 402 includes processor 102, which is included in a separate die stacked with multiple memory dies that form memory portion 110. Processor 102 includes at least one accelerated processing unit (i.e., an advanced processing unit including a central processing unit and a graphics processing unit), central processing unit, graphics processing unit, or other processor and may include coprocessors or fixed-function processing hardware.

Figure 3:
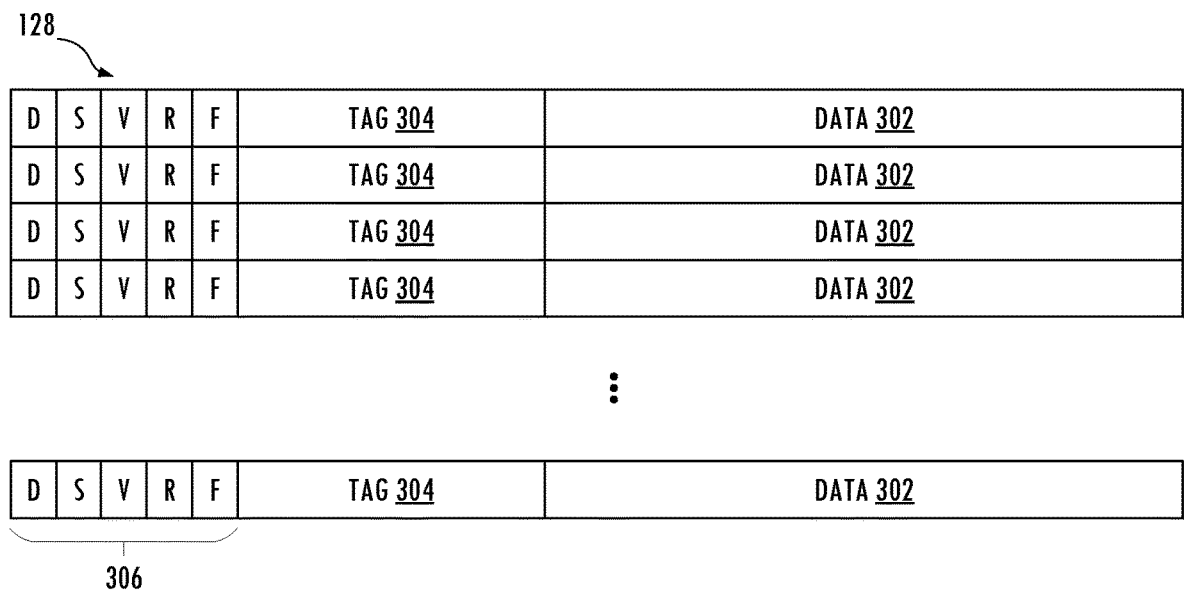
FIG. 3 illustrates an exemplary cache of the processor of FIG. 2 consistent with at least one embodiment of the invention.

Referring to FIGS. 2 and 3, in at least one embodiment, cache 128 includes cache lines each having data portion 302, tag portion 304, and metadata portion 306. Metadata portion 306 includes a conventional valid bit (V) and a conventional dirty bit (D). In addition, metadata portion 306 includes additional metadata bits per cache line: a shared bit (S), and in some embodiments, a remote bit (R). Cache controller 140 encodes and updates the metadata bits when allocating a cache line and/or later accessing the cache line in response to a memory access by processor 102. The remote bit indicates whether the cache line is associated with a memory address in a remote memory or a memory address in memory portion 110, which is local to processor 102. The shared bit indicates whether the cache line is associated with a memory address that is shared with other processors or is private to processor 102. As discussed above, accesses to shared, writeable data occur within a critical section of a program executing on processor 102. Although the remote bit is not required for the cache coherence technique described herein since whether the location is remote or local may be determined based on tag portion 304, the remote bit explicitly conveys that information without requiring cache controller 140 to perform a tag look-up and an address boundary check each time the data of that cache line is accessed.

Referring to FIG. 1, note that release consistency (RC) models forbid accesses to shared, writeable data outside a critical section. A critical section is guarded by operations that indicate the beginning and end of the critical section, e.g., acquire and release operations. Although the technique is described in the context of release consistency models, the technique is applicable to any memory consistency model where updates to shared data are contained within clearly delineated sections of code. Processors 102, 104, and 106 can cache any data they read and write from local or remote memory. Processing system 100 determines whether a data item is stored in local memory or remote memory by the memory address being accessed since the physical address space is statically distributed among the memory modules.

In response to processor 102 accessing data associated with a memory address of memory portion 110, which is local memory to processor 102, and allocating an associated cache line, processor 102 loads the data from memory portion 110 and encodes the remote bit of the cache line associated with the data to indicate that the cache line is associated with a memory address that is in local memory (e.g., sets the remote bit to '0'). That technique does not introduce additional external communication or scalability limits for reads from local memory.

In response to processor 102 writing data associated with a memory address of memory portion 110 to its local cache, cache controller 140 encodes a modified state in the associated dirty bit (e.g., sets the dirty bit to '1') and encodes a local state in the remote bit (e.g., sets the remote bit to '0'). If that write occurs within a critical section of the program executing on processor 102, cache controller 140 encodes the shared bit to indicate that the associated memory address is shared with other processors (e.g., sets the shared bit to '1'), otherwise cache controller 140 encodes the shared bit to indicate that the associated memory address is private to processor 102 (e.g., sets the shared bit to '0'). Thus, writes to local memory do not introduce additional external communication or scalability limits.

In response to processor 102 loading data from a memory address associated with remote memory (e.g., memory on processor 104), cache controller 140 encodes the remote bit of the cache line associated with the data to indicate that the memory address is associated with remote memory (e.g., sets the remote bit to '1'). Since processor 102 may cache data read from remote memory, processing system 100 facilitates applications in which read-only data are frequently shared among a plurality of processors or accelerators (e.g., look-up tables).

In response to processor 102 writing data to a memory address associated with remote memory, processor 102 stores the data in its local cache and cache controller 140 encodes the dirty bit to indicate the data has been written and encodes the remote bit to indicate that the associated memory location is in remote memory (e.g., sets the remote bit to '1'). If the write occurs within a critical section, cache controller 140 encodes the shared bit to indicate that the associated memory address is shared with other processors (e.g., sets the shared bit to '1') and otherwise, encodes the shared bit to indicate that the associated memory address is private to processor 102 (e.g., sets the shared bit to '0'). Thus, processor 102 may cache written data that is stored in remote memory and the cache may use a write-back policy, even for remote data.

In at least one embodiment of the cache coherence technique, a critical section of a program executing on processor 102 includes an acquire operation and a release operation. Within the critical section, the cache coherence technique ensures that any reads from remote memory will receive updated data from remote memory. In at least one embodiment, execution of an acquire operation causes processor 102 to flush all remote data from its caches. For example, processor 102 invalidates clean cache lines associated with remote memory and flushes dirty cache lines associated with remote memory. The acquire operation does not complete until the flush process is completed. This approach invalidates any stale data in the cache of processor 102, which includes cache lines that are ignorant of any remote writes. Thus, subsequent reads by processor 102 will receive updated data from the remote memory. This technique flushes any cache lines associated with remote memory even if those cache lines are not touched within the critical section.

Another approach to ensuring that any reads by processor 102 from remote memory will receive updated data from remote memory includes leaving remote cache lines in the cache unless accessed by processor 102 within a critical section. If processor 102 accesses a cache line associated with remote memory within the critical section, cache controller 140 flushes the cache line on a first access to it within the critical section. For example, processor 102 invalidates a clean cache line associated with remote memory in response to its first access within the critical section and flushes a dirty cache line associated with remote memory in response to its first access within the critical section. This approach uses on-demand invalidation, i.e., flushes and probes for an up-to-date copy only for remote cache lines that actually are accessed within the critical section.

On-demand invalidation may improve performance by reducing the number of flushes. On-demand invalidation uses a first access bit (F) in the metadata portion of each cache line. The first access bit specifies whether the cache line has been accessed for the first time within the critical section. Once processor 102 executes an acquire operation, core 130 initializes the first access bit in all cache lines (e.g., sets the first access bit to '1'). When core 130 accesses a cache line within the critical section, that cache line having a first access bit with the initialization value indicates that cache line is being accessed for the first time. If the first access bit and the remote bit indicate that the associated cache line is being accessed for the first time and associated with remote memory, respectively, processor 102 flushes the cache line and loads new data for that address from remote memory. If the first access bit has a value different from the initialization value (e.g., is unset) or the remote bit indicates the cache line is associated with local memory, no coherence action is needed.

Both of the above-described techniques for ensuring that any reads by core 130 from remote memory will receive updated data from remote memory may maintain any read-only, shared data in the cache. Since both techniques include the flush operation within the core executing the acquire operation, the techniques do not limit scalability. In addition, note that if the cache line has metadata indicating that the data is associated with remote memory and is dirty and shared (i.e., written within a critical section), typically a prior execution of a release operation should have flushed the cache line. However, since critical sections may be nested, processor 102 may flush a dirty cache line associated with a remote and shared memory address in response to an acquire operation to properly account for false sharing. If the cache line has states indicating the data is dirty and associated with a remote memory and is private (i.e., accessed outside a critical section) then it does not matter whether the cache line is flushed since other processors do not share the data.

Processor 102 may flush cache lines associated with remote memory in response to an acquire operation by stepping through the cache lines, one line at a time, to identify and flush any data associated with remote memory. This may be done in software or via a dedicated hardware unit at each cache. While stepping through the cache lines is feasible for small caches, in general, it is expensive for large caches. Another technique for flushing cache lines associated with remote memory uses the metadata to improve flushing remote cache lines in response to an acquire operation. When processor 102 allocates a cache line corresponding to a local memory address, processor 102 encodes the valid bit to indicate that the data is valid, consistent with conventional caching techniques, and also encodes a remote bit to indicate that the data is not associated with a remote memory. When processor 102 allocates a cache line in response to a memory access to a memory address in remote memory, processor 102 encodes the valid bit to indicate that the data is invalid and encodes the remote bit to indicate the cache line is associated with an address in remote memory. Processor 102 considers a cache line valid if either the valid bit indicates the data is valid or the remote bit indicates the data is associated with a remote memory. Processor 102 invalidates only the remote data by encoding all remote bits of all cache lines to indicate the data is not associated with a remote memory (e.g., clears all remote bits of all cache lines). The invalidation leaves cache lines associated with local memory unaffected and invalidates all cache lines associated with remote memory. An efficient implementation quickly clears the remote bit of every cache line, e.g., by storing the remote bit for all cache lines in a separate hardware structure in which all bits can be reset in parallel. However, that technique may be inapplicable to flushing cache lines.

In response to a release operation, processor 102 must make shared, dirty data visible to any external accesses. For example, if processor 102 writes a memory address associated with local memory, a subsequent access to that memory address by another processor must see the latest value of the data at or before the next release operation executed by processor 102. Writing through to memory in response to each write, flushing all accumulated writes in the caches to memory in response to a release operation, via external accesses checking the caches of processor 102, or by some combination thereof, ensures that condition. Dirty cache lines that are modified within the critical section must be made visible to other processors. Therefore, shared, dirty cache lines associated with remote memory must be flushed and shared dirty cache lines associated with local memory must be probed in response to accesses by other processors. If the cache lines cannot be probed, shared dirty cache lines associated with local memory also must be flushed. Processor 102 flushes any write-combining buffers to any memory in the coherent system in any path of processor 102, which executes the release operation. Note that this typically only involves buffers within processor 102, which executes the release operation, and therefore does not limit scalability. This technique guarantees that any writes performed before the release operation executed by processor 102 are visible to any other processors within the coherent system. The release operation does not complete until the writes have been flushed to a point where they cannot be re-ordered with subsequent writes from processor 102 executing the release operation.

Note that dirty cache lines that are accessed outside a critical section need not be flushed since these cache lines are considered private data (i.e., not shared) and thus, need not be made visible to other processors. This reduction in writes to memory may improve performance for applications with low data sharing. In addition, note that once processor 102 writes a dirty cache line to memory, a memory controller of a home processor (i.e., a processor including the memory that stores the cache line) sends coherence transactions (e.g., invalidation requests) to its local caches to update or invalidate any local copy, thereby ensuring that local copies are coherent with memory. No remote coherence transaction is necessary; thus, coherence transactions do not limit scalability. Further, to address false sharing situations, which may occur when multiple processors access disjoint parts of the same cache line, per-byte dirty bits may be used to account for partial modifications of a cache line. Only dirty bytes are updated in memory, e.g., by transferring only the part of cache line that is modified (diffs) and by merging partial modifications, all owing simultaneous writes to disjoint parts of the cache line in the absence of a data race.

Figure 5:
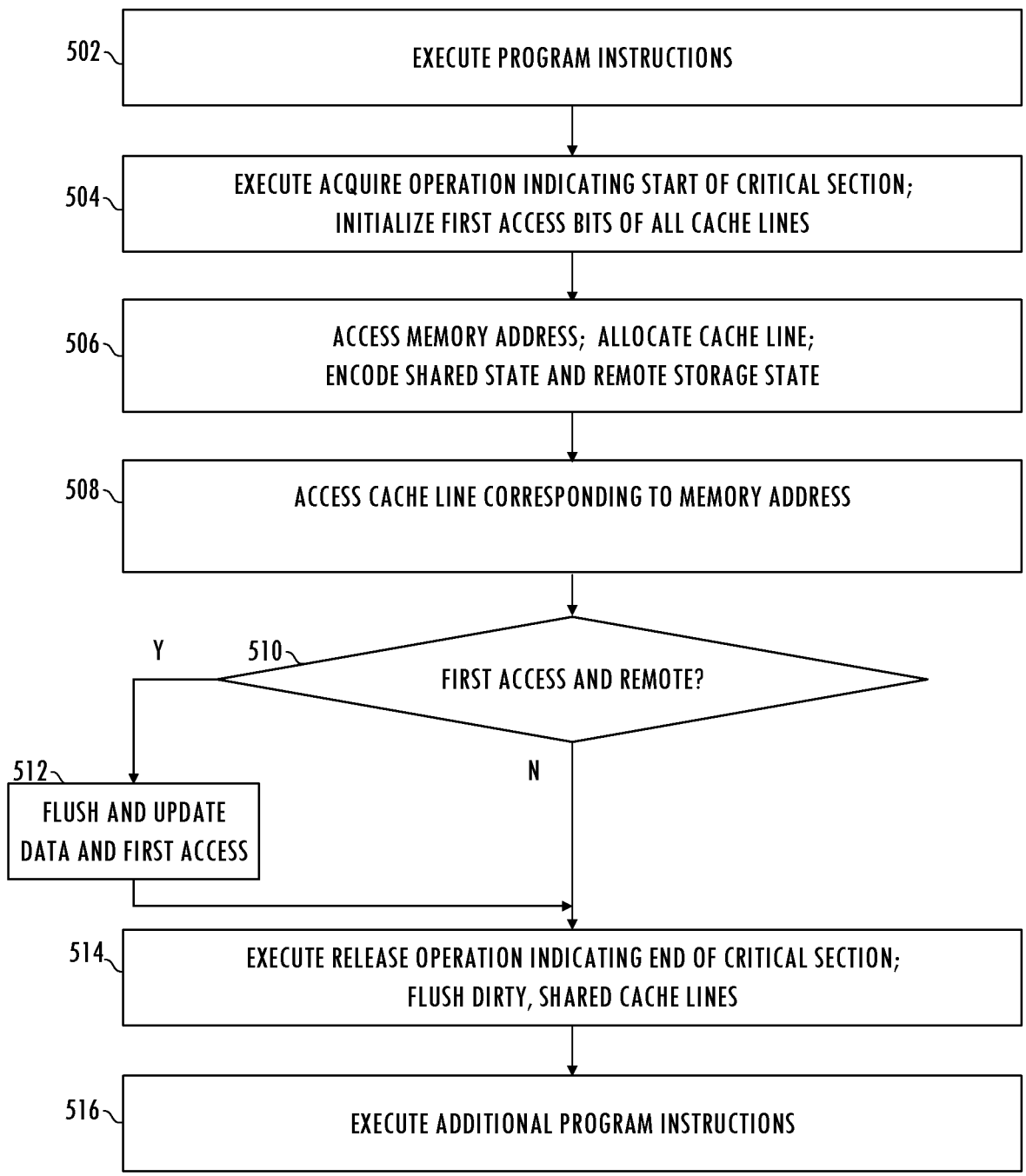
FIG. 5 illustrates information and control flows for an exemplary locality-aware, sharing-aware cache coherence technique for a multiprocessor system consistent with at least one embodiment of the invention.

Referring to FIGS. 2, 3, and 5, in at least one embodiment of a multi-processor system implementing a locality-aware, sharing-aware cache coherence technique, processor 102 executes instructions of a program on one or more cores (502). In response to executing an acquire operation indicating a start of a critical section of the program, cache controller 140 initializes all first access bits in the cache to a state indicating that the cache lines have not yet been accessed for the first time in this critical section (504). As processor 102 executes instructions of the critical section, an access to a memory address that does not have a corresponding entry in the cache (e.g., resulting in a cache miss) causes cache controller 140 to allocate a cache line to that memory address. Cache controller 140 encodes the corresponding shared bit to indicate that the memory address is shared since the access occurs in a critical section of the program. In addition, cache controller 140 encodes the corresponding remote bit according to the location of the memory address in shared memory, consistent with the description above (506).

As processor 102 continues to execute instructions of the critical section, processor 102 executes an instruction that accesses a memory address that has been allocated a corresponding cache line (e.g., resulting in a cache hit). Processor 102 accesses the corresponding cache line (508) and determines whether this access is a first access to the cache line in this critical section (510). Note that the cache line may have been allocated by a previous critical section of the program prior to this critical section. If this access is the first access to the cache line in this critical section and corresponds to a memory address in remote memory, cache controller 140 flushes the cache line and updates the data from memory to obtain the most recent data, which may have been updated by another processor prior to entering this critical section (512). In addition, cache controller 140 updates the first access bit. If this access is not the first access to the cache line in this critical section (510), processor 102 continues with execution of the critical section since it was already updated on a first access and the programming model guarantees that no other processor writes to the shared memory location during execution of this critical section. In response to executing a release operation indicating an end of this critical section, cache controller 140 flushes all cache lines associated with shared memory addresses containing dirty data to make writes to shared memory addresses by processor 102 visible to any other processors of the multi-processor system (514). Processor 102 continues to execute instructions of the program (516). The information and control flows of FIG. 5 are exemplary only and other sequences of operations are consistent with the locality-aware, sharing-aware cache coherence techniques and variations thereof described above.

Cache coherence techniques for systems that incorporate multiple processors or accelerators with local memories have been described. The cache coherence techniques may be useful for systems of processors that infrequently access remote memory. The cache coherence techniques described herein may achieve performance like that of traditional cache coherence schemes, but with less hardware and reduced power consumption due to reductions in directory storage and coherence messaging. The cache coherence techniques described herein may achieve better performance than simpler schemes based on cache flushing. The cache coherence techniques described herein integrate with other coherence schemes that are in place in each processor for maintaining coherence among cores within a processor.

The cache coherence techniques described herein reduce or eliminate the need for explicit tracking of data sharing among processors and the need for coherence messages among processors. The technique may be scaled to an arbitrary number of processors, i.e., the cache coherence features of individual processors are independent of the number of processors in a system. In addition, the cache coherence techniques described herein need not know the number of sharers in the system. The cache coherence techniques described herein allow efficient performance for optimized code where processors share limited amounts of data (i.e., perform limited amounts of memory accesses to remote memory) and writes to shared data are explicitly contained within critical sections denoted by synchronization operations. Note that this protocol still guarantees correctness (albeit at degraded performance) for unoptimized code where processors share large amounts of data.

Structures described herein may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a disk, tape, or other magnetic, optical, or electronic storage medium.

The description of the invention set forth herein is illustrative, and is not intended to limit the scope of the invention as set forth in the following claims. For example, while the invention has been described in embodiments in which a write-back policy is used, the cache coherence technique may be adapted for caches using other writing policies, e.g., write-through caches, and caches with write-combining buffers. Write-combining buffers may be used to improve communication efficiency (i.e., combine multiple writes to the same line by the same core before sending the cache line over the interconnect). Variations and modifications of the embodiments disclosed herein, may be made based on the description set forth herein, without departing from the scope of the invention as set forth in the following claims.

What is claimed is:

1. A method for operating a multi-processor system including shared memory, the method comprising:
   executing an instruction of a program by a processor, the instruction accessing a memory address in the shared memory;
   in response to execution of the instruction accessing the memory address in the shared memory:
      allocating a cache line of a cache memory of the processor to the memory address in the shared memory;
      encoding a shared information state of the cache line to indicate whether the memory address is a shared memory address shared by the processor and a second processor, or private to the processor; and
      encoding a remote storage state of the cache line to indicate whether the memory address is remote to the processor or local to the processor;
   in response to an access of the cache line:
      selectively flushing the cache line and loading data from the memory address into the cache line based on the shared information state, the remote storage state, and a first access state; and
      selectively encoding the first access state to indicate a next access to the cache line in a critical section is not a first access to the cache line in the critical section based on the shared information state, the first access state, and the remote storage state.

2. The method, as recited in claim 1, further comprising:
   executing an operation indicating a beginning of the critical section of the program; and
   in response to executing the operation, initializing the first access state to indicate the first access of the memory address has not yet occurred.

3. A processing system comprising:
   a processor;
   a cache controller of the processor; and
   a cache memory of the processor coupled to the cache controller, the cache memory comprising a cache line comprising a tag portion, a data portion, and a metadata portion,
   wherein the processor is configured to execute an instruction of a program, the instruction accessing a memory address in a shared memory, and
   wherein the cache controller is configured to allocate the cache line of the cache memory to the memory address in the shared memory in response to the instruction being executed, encode a shared information state of the cache line to indicate whether the memory address is shared by the processor and a second processor, or private to the processor, encode a remote storage state of the cache line to indicate whether the memory address is remote to the processor or local to the processor, and configured to access the cache line, and to flush the cache line and load data from the memory address into the cache line in response to the shared information state indicating the memory address is shared by the processor and the second processor, the remote storage state indicating the memory address is remote, and a first access state indicating the access is a first access to the cache line in a critical section of the program, and encode the first access state to indicate a next access to the cache line in the critical section is not the first access.

4. The processing system, as recited in claim 3, wherein the processor is configured to execute an operation indicating a beginning of the critical section of the program and to initialize the first access state to indicate the first access of the memory address has not yet occurred in response to execution of the operation indicating the beginning of the critical section of the program.

5. The method, as recited in claim 1,
   wherein the instruction is executed in a first critical section of the program, and
   wherein the access of the cache line is in response to executing a second instruction of the program by the processor in a second critical section of the program,
   wherein the shared information state indicates the memory address is a shared memory address, the first access state indicates the access is the first access, the remote storage state indicates the memory address is remote to the processor, and the selectively flushing flushes the cache line and loads the data from the memory address into the cache line and the selectively encoding encodes the first access state to indicate the next access to the cache line in the second critical section is not the first access to the cache line in the second critical section.

6. The method, as recited in claim 1,
wherein the instruction is executed in a first critical section of the program,
wherein the access of the cache line is in response to executing a second instruction of the program by the processor in the first critical section,
wherein the shared information state indicates the memory address is a shared memory address, the first access state indicates the access is not the first access or the remote storage state indicates the memory address is remote to the processor,
wherein the selectively flushing does not flush the cache line or load the data from the memory address into the cache line, and
wherein the selectively encoding does not encode the first access state.

7. The method, as recited in claim 1, wherein the shared information state, the remote storage state, and the first access state are encoded in a metadata portion of the cache line.

8. The method, as recited in claim 1,
wherein the instruction is executed in a first critical section of the program, the method further comprising:
executing a second instruction accessing the memory address in a second critical section of the program,
wherein executing the second instruction includes the selectively flushing and the selectively encoding.

9. The method, as recited in claim 1, further comprising:
wherein the instruction is not executed in any critical section of the program,
wherein the shared information state indicates the memory address is private to the processor, and
wherein the selectively flushing does not flush the cache line and does not load the data from the memory address.

10. The method, as recited in claim 2, further comprising:
executing a second operation indicating an end of the critical section of the program; and
in response to executing the second operation indicating the end of the critical section, selectively flushing the cache line based on a dirty state of the cache line and the shared information state of the cache line.

11. The processing system, as recited in claim 3,
wherein the shared information state, the remote storage state, and the first access state are encoded in the metadata portion of the cache line.

12. The processing system, as recited in claim 3,
wherein the shared information state is encoded based on whether the instruction is executed in the critical section of the program.

13. The processing system, as recited in claim 3,
wherein the instruction is executed in a first critical section of the program,
wherein the access of the cache line is in response to the processor executing a second instruction of the program accessing the memory address in a second critical section of the program, and
wherein the cache line is flushed, the data is loaded, and the first access state is encoded in response to executing the second instruction.

14. The processing system, as recited in claim 3,
in response to the processor executing an operation indicating an end of the critical section, the cache controller is configured to selectively flush the cache line based on a dirty state of the cache line and the shared information state of the cache line.

15. A processor comprising:
a cache controller; and
a cache memory comprising a cache line comprising a tag portion, a data portion, and a metadata portion,
wherein the cache controller is configured to allocate the cache line of the cache memory to a memory address in a shared memory in response to the processor executing an instruction of a program, the instruction accessing the memory address in the shared memory, encode a shared information state of the cache line to indicate whether the memory address is shared by the processor and a second processor, or private to the processor, encode a remote storage state of the cache line to indicate whether the memory address is remote to the processor or local to the processor, and configured to access the cache line, and to flush the cache line and load data from the memory address into the cache line in response to the shared information state indicating the memory address is shared by the processor and the second processor, the remote storage state indicating the memory address is remote, and a first access state indicating the access is a first access to the cache line in a critical section of the program, and encode the first access state to indicate a next access to the cache line in the critical section is not the first access.

16. The processor, as recited in claim 15, wherein the processor is configured to execute an operation indicating a beginning of the critical section of the program and to initialize the first access state to indicate the first access of the memory address has not yet occurred in response to execution of the operation indicating the beginning of the critical section of the program.

17. The processor, as recited in claim 15,
wherein the shared information state, the remote storage state, and the first access state are encoded in the metadata portion of the cache line.

18. The processor, as recited in claim 15,
wherein the shared information state is encoded based on whether the instruction is executed in the critical section of the program.

19. The processor, as recited in claim 15,
wherein the instruction is executed in a first critical section of the program,
wherein the access of the cache line is in response to the processor executing a second instruction of the program accessing the memory address in a second critical section of the program, and
wherein the cache line is flushed, the data is loaded, and the first access state is encoded in response to executing the second instruction.

20. The processor, as recited in claim 15,
in response to the processor executing an operation indicating an end of the critical section, the cache controller is configured to selectively flush the cache line based on a dirty state of the cache line and the shared information state of the cache line.

* * * * *